Patented May 19, 1936

2,041,076

UNITED STATES PATENT OFFICE 2,041,076

PENETRATING OIL

Bert H. Lincoln and Alfred Henriksen, Ponca City, Okla., assignors to Continental Oil Company, Ponca City, Okla., a corporation of Delaware No Drawing. Application July 25, 1932, Serial No. 624,645

9 Claims. (Cl. 87—9)

Our invention relates to a penetrating oil and products of that general character which are useful in loosening rusted, corroded or so called "frozen" connections. Under some conditions of use the product of our present invention may be considered as a lubricant, as well as a penetrating oil.

Objects of our invention are:

To provide a composition having improved penetrating characteristics;

To provide a composition having a low surface tension;

To provide a composition characterized by a high degree of capillarity;

To provide a composition characterized by its ability to quickly work its way into extremely minute spaces and to loosen or dissolve rust or corrosion which prevents movement;

To provide a composition characterized by its ability to penetrate into extremely minute spaces where metal contacts metal and act as a high quality lubricant under the conditions of boundary lubrication existing.

Those skilled in the art of preparing and using penetrating oil have known for a long time that a penetrating composition should have a low surface tension and/or a high degree of capillarity. Animal and vegetable oils have been used to obtain these characteristics in the past in various and innumerable compositions. These compositions require rather large quantities of expensive vegetable and animal oils, making the finished penetrating oil expensive. The animal and vegetable oils used have had a tendency to break down in use, causing gumming, sticking, etc., and even tho fairly efficient as penetrating oils, have never been satisfactory as lubricants.

Penetrating oils are always used under conditions similar to those encountered in boundary lubrication, but more severe. The penetrating oil must penetrate between two metal surfaces which are corroded or otherwise attached to each other. After entering between these metal surfaces it must act as a high oiliness or unctuous lubricant under conditions of slow speeds of movement and high pressures. Under these conditions penetrating oils now known, which are prepared from animal and vegetable oil, are not satisfactory. Our composition, even though similar in some respects to penetrating oils previously known and used, is satisfactory and highly efficient.

The use of organic fatty acids instead of the usual animal and vegetable oils gives us our great improvement. Any of the organic fatty acids may be used, such as those obtained by saponification of animal and vegetable oils, those occurring in nature, and those synthetically prepared. Our fatty acid composition penetrates and loosens "frozen" connections much easier and quicker than similar compositions using animal or vegetable oils instead of fatty acids. We do not know the cause of this improved action but believe the greater chemical activity of the acids as compared to the animal and vegetable oils is responsible.

We have further found that by halogenation of the fatty acids prior to use in our composition, greatly improved penetrating compositions result. The fatty acids may be halogenated by any of the ordinary means, the degree of halogenation depending upon the organic acid being used and the characteristics required in the finished penetrating oil.

Still another improvement in penetrating oils is obtained by using halogenated animal and vegetable oils instead of straight animal and vegetable oils in the composition. Smaller quantities of halogenated oils may be used in the composition, and the finished composition will be superior in service. As with the fatty acids, the halogen may be introduced into the animal and/or vegetable oil by any of the well known halogenation processes. Direct chemical addition or substitution is entirely satisfactory.

We have found that ordinary commercial fatty acids and commercial oils and esters are satisfactory for use in our composition. The commercial impurities do not have any objectionable action.

Esters of high molecular weight fatty acids may be used in our composition instead of the fatty acid. For example, ethyl oleate may be used instead of oleic acid. The esters are very efficient in our composition.

Halogenation of the esters gives an additional improvement. The halogenated esters are used in the composition to replace the acids, halogenated acids or esters. The esters may be halogenated by any of the well known means. The halogen atoms may be in either the acid or alcohol radical. The degree of halogenation may be varied depending on the ester being halogenated and the specific use of the composition into which the halogenated ester is blended.

Our compositions include as essential ingredients, in addition to the substances above enumerated, kerosene or other light hydrocarbons (28.0° A. P. I. gravity or higher), light lubricating oils (say of 20° A. P. I. gravity or lighter)—gravity in both cases may vary depending on type of crude from which derived—and a light low boiling solvent, such as esters prepared from low molecular weight acids and alcohols, benzol and the like. Lubricating oils having a Saybolt viscosity of from 70 seconds to 350 seconds or more at 100° F. have been found satisfactory. Due to the high oiliness and high film strength of our composition, the addition of graphite is optional. If graphite is used, a finely divided or powdered product is satisfactory.

The following typical compositions are shown as examples of our compositions but not to act as a limitation. The ingredients are shown in percent by volume:

I.
| | Per cent |
|---|---|
| Kerosene | 60–75 |
| Lubricating oil | 22–37 |
| Oleic acid | 0.5–3.0 |
| Amyl acetate | 0.1–2.0 |

In the above example the oleic acid may be replaced with any of the organic fatty acids, such as stearic acid, fatty acids from corn oil or cotton seed oil or cocoanut oil or castor oil, etc., and/or mixtures of the various fatty acids.

II.
| | Per cent |
|---|---|
| Kerosene | 60–75 |
| Lubricating oil | 22–37 |
| Chlorinated stearic acid 13° F. M. P. | 0.5–3.0 |
| Butyl butyrate | 0.1–2.0 |

In the above example any of the halogenated fatty acids may be used instead of the 13° F. M. P. chlorinated stearic acid. Various degrees of halogenation of each fatty acid may also be used.

III.
| | Per cent |
|---|---|
| Kerosene | 60–75 |
| Lubricating oil | 22–37 |
| Chlorinated lard oil | 0.5–3.0 |
| Butyl propionate | 0.1–2.0 |

In the above example any of the halogenated animal or vegetable oils could be used in place of the chlorinated lard oil.

IV.
| | Per cent |
|---|---|
| Kerosene | 60–75 |
| Lubricating oil | 22–37 |
| Ethyl oleate | 0.5–3 |
| Benzol | 1.0–5 |

In the above example any of the commercial ester may be used, the synthetic or natural esters being satisfactory. Smaller quantities of amyl acetate or some similar ester may be used instead of the benzol.

V.
| | Per cent |
|---|---|
| Kerosene | 60–75 |
| Lubricating oil | 22–37 |
| Chlorinated ethyl oleate | 0.5–3.0 |
| Amyl acetate | 0.1–2.0 |

Any of the halogenated esters may be substituted for the chlorinated ethyl oleate mentioned in the above example.

In all of the above examples the word "kerosene" is used to represent a relatively low boiling hydrocarbon oil and may be one of the naphthas, light gas oil, one of the pressure naphthas, or the like, in the raw or refined state.

The percentage composition range shown in each example is rather broad but the range is not a limitation, as one skilled in the art will realize that 59% kerosene might be used and/or 3.1% oleic acid, both of which are out of the range covered in the examples but within the broad disclosure of our invention.

Having thus described our invention, what we claim is:

1. A penetrating oil comprising in combination a low boiling petroleum oil, a small amount of halogenated fatty acid, and a solvent.

2. A penetrating oil comprising in combination a low boiling petroleum oil, a small amount of chlorinated fatty acid and a solvent.

3. A penetrating oil comprising in combination a low boiling petroleum oil, a small amount of a halogenated ester of a fatty acid, and a solvent.

4. A penetrating oil comprising in combination a low boiling petroleum oil, a small amount of a chlorinated ester of a fatty acid, and a solvent.

5. A penetrating oil comprising in combination kerosene, a low viscosity lubricating oil, chlorinated fatty acid, and a solvent.

6. A penetrating oil comprising in combination kerosene, a low viscosity lubricating oil, a chlorinated ester of a fatty acid and a solvent.

7. A penetrating oil comprising in combination kerosene, a low viscosity lubricating oil, chlorinated ethyl oleate and amyl acetate.

8. A penetrating oil comprising in combination 60 to 75% kerosene, 22 to 37% lubricating oil, ½ to 3% chlorinated ethyl oleate and $\frac{1}{10}$ to 2% of amyl acetate.

9. A penetrating oil comprising in combination a low boiling petroleum oil, a solvent, and a small amount of one of the following groups: halogenated fatty acids, halogenated esters of fatty acids.

BERT H. LINCOLN.
ALFRED HENRIKSEN.